United States Patent
Aggarwal et al.

(10) Patent No.: US 12,488,605 B2
(45) Date of Patent: Dec. 2, 2025

(54) INTELLIGENT NESTED TABLES DETECTION AND TEXT EXTRACTION FROM IMAGES AND SCANNED DOCUMENTS

(71) Applicant: Accenture Global Solutions Limited, Dublin (IE)

(72) Inventors: Nakul Aggarwal, Kapurthala (IN); Snehlata Sinha, Patna (IN); Karna Rajesh Rewatkar, Nagpur (IN); Debasmita Ghosh, Kolkata (IN)

(73) Assignee: Accenture Global Solutions Limited, Dublin (IE)

( * ) Notice: Subject to any disclaimer, the term of this patent is extended or adjusted under 35 U.S.C. 154(b) by 401 days.

(21) Appl. No.: 18/318,046

(22) Filed: May 16, 2023

(65) Prior Publication Data
US 2024/0386735 A1    Nov. 21, 2024

(51) Int. Cl.
| | |
|---|---|
| *G06V 30/146* | (2022.01) |
| *G06F 40/232* | (2020.01) |
| *G06V 30/148* | (2022.01) |
| *G06V 30/18* | (2022.01) |

(52) U.S. Cl.
CPC .......... *G06V 30/147* (2022.01); *G06F 40/232* (2020.01); *G06V 30/153* (2022.01); *G06V 30/1801* (2022.01)

(58) Field of Classification Search
CPC .................................................... G06F 40/232
See application file for complete search history.

(56) References Cited

U.S. PATENT DOCUMENTS 7,707,488 B2 * 4/2010 Gurcan ................. G06F 40/103
715/228

OTHER PUBLICATIONS

Aman Savaria, "TableNet: Deep Learning Model for End to End Table Detection and Tabular Data Extraction from Scanned Document Images," published in Analytics Vidhya, August 16, 2021, 36 pgs. Printed from the Internet May 10, 2023, https:/medium.com/analytics-vidhya/tablenet-deep-learning-model-for-end-to-end-table-detection-and-tabular-data-extraction-from-a26790097a50.

Vihar Kurama, et al., "Table Detection, Table Extraction & Information Extractoin using DL," Copyright © 2021 Nano Net Technologies Inc., 52 pgs. Printed from the Internet May 10, 2023, https://nanonets.com/blog/table-extraction-deep-learning/#extract-table-from-image-with-nanonets-table-ocr.

(Continued)

*Primary Examiner* — Edward Park
(74) *Attorney, Agent, or Firm* — Polsinelli PC

(57) ABSTRACT

Methods, systems, and apparatus are provided for detecting and extracting data from a nested table. A contour image of a first table disposed within a cell of a second table from an input image is identified. The first table on the input image is masked to generate a masked image of the second table that omits the first table. Cells of the first table and the second table are detected by identifying a plurality of regions of interest (ROIs), determining a row of a plurality of cells based on a common y-coordinate among of the plurality of ROIs, and generating cell parameter information for each of the plurality of cells that identifies the y-coordinate, a size, and a relative position of each determined cell. An output file is generated based on the cell parameter information of the plurality of cells.

20 Claims, 16 Drawing Sheets

(56) References Cited

OTHER PUBLICATIONS

Sachin Raja, et al., "Visual Understanding of Complex Table Structures from Document images," provided by the Computer Vision Foundation, 10 pgs. Printed from the Internet May 10, 2023, https://nanonets.com/blog/table- extraction-deep-learning/#extract-table-from-image-with-nanonets-table-ocr.

Ertugrul Kara, et al, "Deep Learning for Recognizing the Anatomy of Tables on Datasheets," School of Electrical Engineering and Computer Science, University of Ottawa, Ottawa, ON, Canada. 7 pgs. Printed from the Internet May 10, 2023, http://nextconlab.academy/iscc19/1570532191.pdf.

Lei Sun, et al., "Enhanced Table Extraction from documents with Form Recognizer," Microsoft Community Hub, January 14, 2021, 8 pgs. Printed from the Internet May 10, 2023, https:/techcommunity.microsoft.com/15/ai-cognitive-services-blog/enhanced-table-extraction-from-documents-with-form-recognizer/ba-p/2058011.

\* cited by examiner

Nested Table with Merged Rows 101

Multiple Nested Tables in Multiple Cells 102

FIG. 1C

Text and Table in a Same Cell
103

| ITEM | DESCRIPTION | QTY | UNIT PRICE | TOTAL |
|---|---|---|---|---|
| Crude Oil | Crude oil barrels<br>Sulfur: Yes<br>Weight: 12 kg<br>Status: Item fully delivered<br><br>\| Barrel No. \| Material \|<br>\| 1223 \| Wooden \|<br>\| 2333 \| Wooden \| | 500 | 30 | 1500 |
| Compressor | Pressure valve Compressors<br>Model: SS03A<br>Serial No: 23568<br>Power: 200 hp<br>Status: Item fully delivered | 5 | 100 | 500 |

FIG. 1D

| ITEM | DESCRIPTION | QTY | UNIT PRICE | TOTAL |
|---|---|---|---|---|
| Valve | Pressure valve<br>Model: API 64<br>Pressure high: 20 Pa<br>Status: Item fully delivered | 5 | 150.00 | 750.00 |
| Compressor | Pressure valve Compressors<br>Model: SSOGA<br>Serial No: 23568<br>Power: 200 hp<br>Status: Item fully delivered | 5 | 100.00 | 500.00 |
| Nickel | Nickel raw Material<br>Total Moisture: 24%<br>Calorific Value: 5800 Kcal/Kg<br>Status: Items partially delivered | Ni-1: 150<br>Ni-2: 50 | 40 | 8,000.00 |

Table in a Cell
104

Input Scanned
Document
400

<p style="text-align:center"><strong>XYZ PETROLEUM</strong></p>

XYZ Petroleum Industries

1/1, Abc town
Port Road – 12345
Phone: (123) 987xxxxxx1

Purchase Order
Date: 1/1/2012
PO#  123456

Vendor
123 Petro Ltd.
2/3, def town
Outer Road – 4564
Phone: (123) 987xxxxxx4

Ship To
YZX Petrochemical Ltd.
412, ring street
Venue town – 8998
Phone: (123) 886xxxxxx3

| Requisitioner | Ship via | F.O.B | Shipping Terms |
|---|---|---|---|
|  |  |  |  |

| Item | Qty. | Unit Price | Total | Description |
|---|---|---|---|---|
| 1.Crude Oil | 220 | 15.00 | 3300.00 | Crude oil barrels<br>Sulfur: Yes, Weight - 10 kg,<br>Status: Fully delivered |
| 2.Compressor | 2 | 15.00 | 30.00 | Pressure valve<br>Model: ACDEF, S No: 55667<br>Status: Fully delivered |
| 3.Sensors | 2 | 300.00 | 600.00 | <table><tr><td>Sensor type</td><td>Model</td></tr><tr><td>Humidity Sensor</td><td>TRSRT</td></tr><tr><td>Pressure Sensor</td><td>IPIPR</td></tr></table> |

| | | |
|---|---|---|
| Comments or Special Instructions | Total  3930.00<br>Tax  70.00<br>Shipping  100.00 | If you have any questions about this purchase order, please contact (XXX mining Company. (123) 786xxxxx6) |
| Thank you for your business | Total  $4100.00 | |

<p style="text-align:center"><strong>FIG. 4</strong></p>

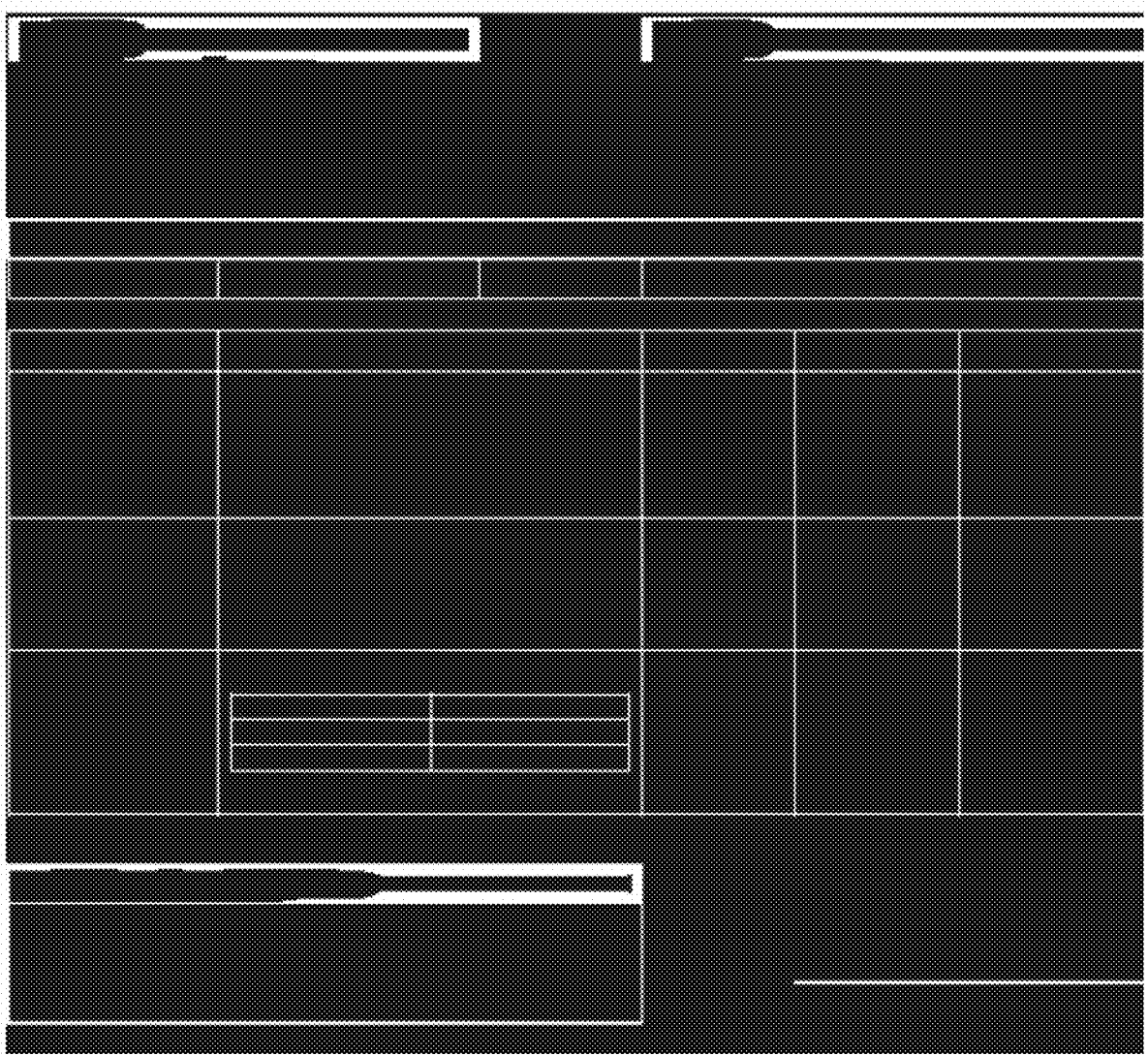

FIG. 7A

Nested Table Masking 214

XYZ PETROLEUM

XYZ Petroleum Industries
1/1, Abc town
Port Road – 12345
Phone: (123) 987xxxxx1

Purchase Order
Date: 1/1/2012
PO# 123456

Vendor
123 Petro Ltd.
2/3, def town
Outer Road – 4564
Phone: (123) 987xxxxx4

Ship To
YZX Petrochemical Ltd.
412, ring street
Venue town – 8998
Phone: (123) 886xxxxx3

| Requisitioner | Ship via | F.O.B | Shipping Terms |
|---|---|---|---|
|  |  |  |  |

| Item | Qty. | Unit Price | Total | Description |
|---|---|---|---|---|
| 1.Crude Oil | 220 | 15.00 | 3300.00 | Crude oil barrels<br>Sulfur: Yes, Weight - 10 kg,<br>Status: Fully delivered |
| 2.Compressor | 2 | 15.00 | 30.00 | Pressure valve<br>Model: ACDEF, S No: 55667<br>Status: Fully delivered |
| 3.Sensors | 2 | 300.00 | 600.00 |  |

| | Total | 3930.00 |
| | Tax | 70.00 |
| | Shipping | 100.00 |
| | Total | $4100.00 |

| Comments or Special Instructions |
|---|
| Thank you for your business |

If you have any questions about this purchase order, please contact (XXX mining Company. (123) 786xxxx6)

Masked Image 705

Masked Out ↑

| Sensor type | Model |
|---|---|
| Humidity Sensor | TRSRT |
| Pressure Sensor | IPIPR |

Nested Table 703

FIG. 7B
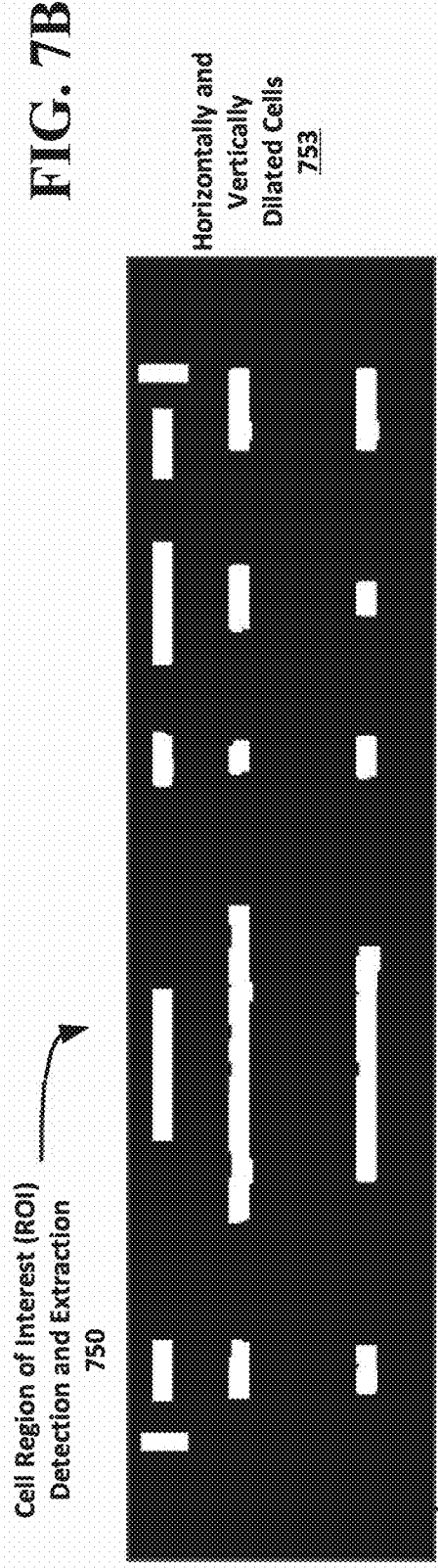
Cell Region of Interest (ROI) Detection and Extraction 750
Horizontally and Vertically Dilated Cells 753
Blob & Contour Detection 754
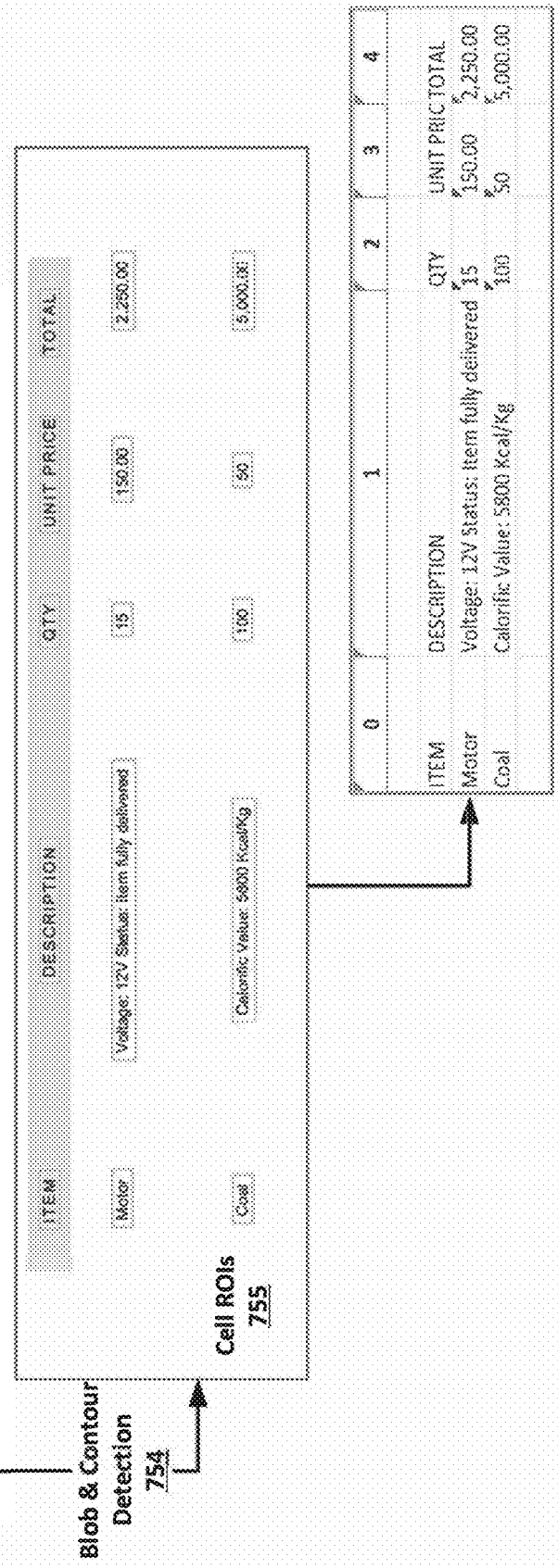
Cell ROIs 755
Extracting and Writing in Output File Format 757

FIG. 8A

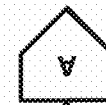

Cell Detection
216

Cell ROIs
755

| Item | | | | |
|---|---|---|---|---|
| 1 | Spend/ Drop | Description | Low | 1 |
| 2 | Status Mismatch | Description | Low | 2 |
| 3 | Blank Customer | Description | Medium | 1 |
| 4 | Date Shift | Description | Medium | 2 |
| 5 | Mass Change/ Product | Description | High | 1 |

Coordinates list of all detected cell ROIs
804

| Item | | | |
|---|---|---|---|
| 1 | Spend/ Drop | Description | Low | 1 |

Start sorting cell ROIs row-wise using y-coordinates
806

Define row-column relationship of each cell using parameters:
- Cell coordinates
- Start row
- End row
- Start column
- End column

808

Calculate average height of all cell ROIs
810

A

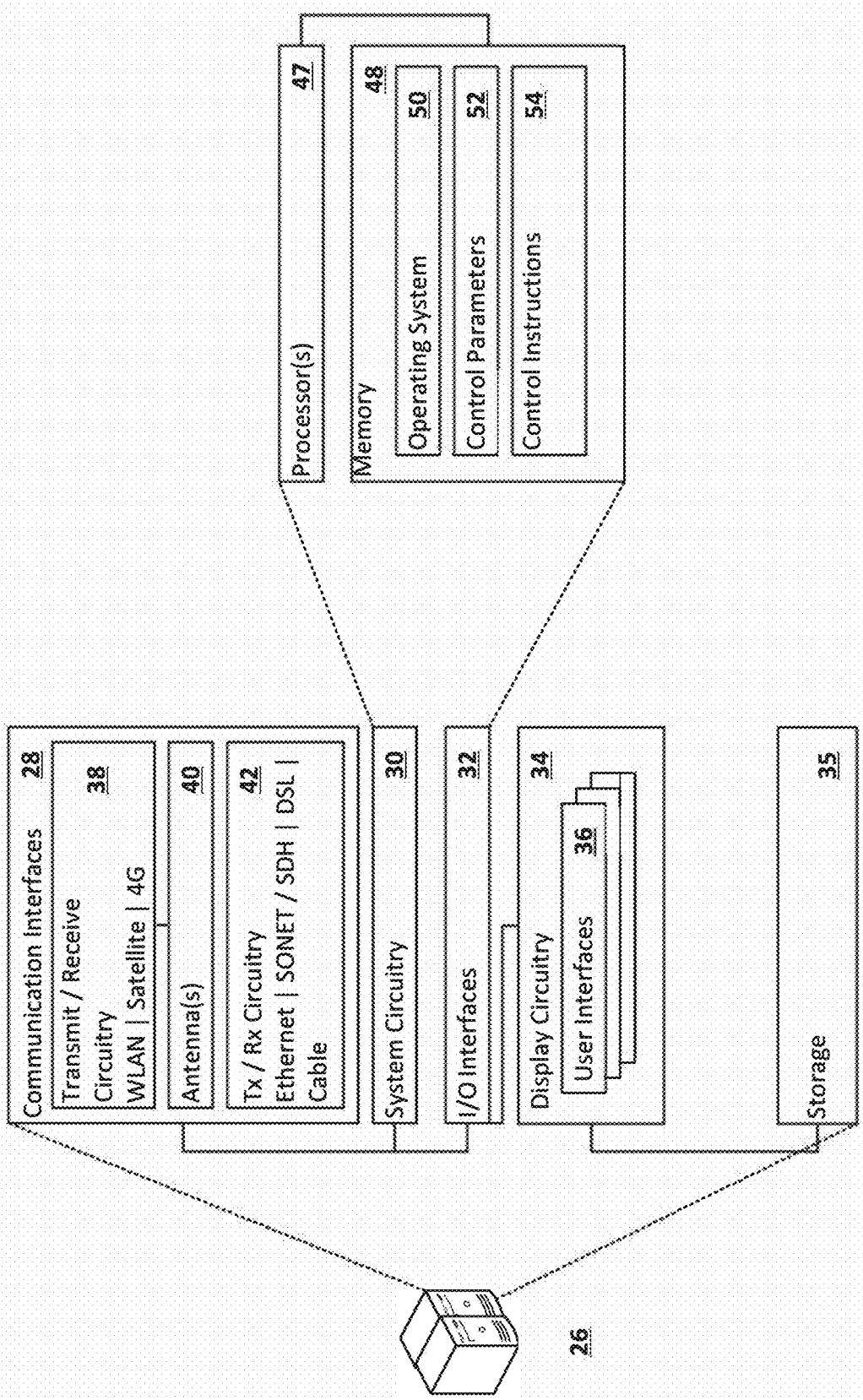

INTELLIGENT NESTED TABLES DETECTION AND TEXT EXTRACTION FROM IMAGES AND SCANNED DOCUMENTS

TECHNICAL FIELD

The present subject matter generally relates to detecting and extracting tabular text data from images and scanned documents, particularly text data arranged within nested tables.

BACKGROUND

Present approaches for extracting text from nested tables in scanned documents suffer from a variety of drawbacks, limitations, and disadvantages. Specifically, extracting text accurately becomes increasingly difficult when the scanned documents have varying backgrounds, colors, and templates. Accordingly, there is a need for inventive systems, methods, components, and apparatuses described herein.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

FIG. 1C illustrates an example table having a nested table and text together within a same cell.

FIG. 1D illustrates an example table having a single nested table within a single cell.

FIG. 4 illustrates an example input scanned document.

FIG. 5 illustrates an example resultant stencil image after image preprocessing is performed in accordance with the present subject matter.

FIG. 7A illustrates a nested table masking process in accordance with the present subject matter.

FIG. 7B illustrates a cell region of interest (ROI) detection and extraction process in accordance with the present subject matter.

FIG. 8A illustrates a portion of a cell detection process in accordance with the present subject matter.

FIG. 10 illustrates computer systems that may be used to implement various components of the intelligent nested table detection and extraction system.

DETAILED DESCRIPTION

Automated detection and extraction of tabular data from scanned documents is an important but difficult task. The process may generally involve identifying tables within a scanned document and recognizing text arranged within those tables. Detecting and extracting textual data from nested tables with suitable accuracy may be increasingly challenging even with state-of-the-art solutions.

The present subject matter may provide techniques to detect and extract tabular data from nested tables arranged within cells of a parent table, as well as bordered tables, uniform and non-uniform tables, borderless tables, and other complex tables having varied backgrounds and colors. The extracted tabular text data may be output in an editable file format, such as a comma-separated values (CSV) file, a spreadsheet file (e.g., xls), a JavaScript Object Notation (JSON) file, and the like. In an example, each nested table and each parent table may be saved as a separate "sheet" in the editable output file format.

Techniques described in accordance with the present subject matter may include at least two stages. A first stage may include automated detection of nested tables within a parent table regardless of format, border, and layout of the scanned documents. A second stage may include cell detection, defining a row-column relationship of each detected cell, and extracting textual data from each detected cell. The information obtained from the first and second stage may be used to convert the extracted data into one of the aforementioned editable file formats. The techniques described herein may be achieved at least in part using open source software libraries such as OpenCV, for example.

Figure 1A:
FIG. 1A illustrates an example table having a nested table within merged rows.
Figure 1B:
FIG. 1B illustrates an example table having multiple nested tables within multiple respective cells.

FIGS. 1A-1D show a plurality of example tables that may be sourced from a variety of scanned documents and images. Specifically, each of the example tables 1A-1D may be problematic for conventional tabular data detection and extraction techniques. For instance, FIG. 1A shows an example table 101 having a nested table found within merged rows. FIG. 1B shows an example table 102 having multiple nested tables found within multiple respective cells. FIG. 1C shows an example table 103 having a nested table and text together within a same cell. FIG. 1D shows an example table 104 having a single nested table within a single cell.

Figure 2:
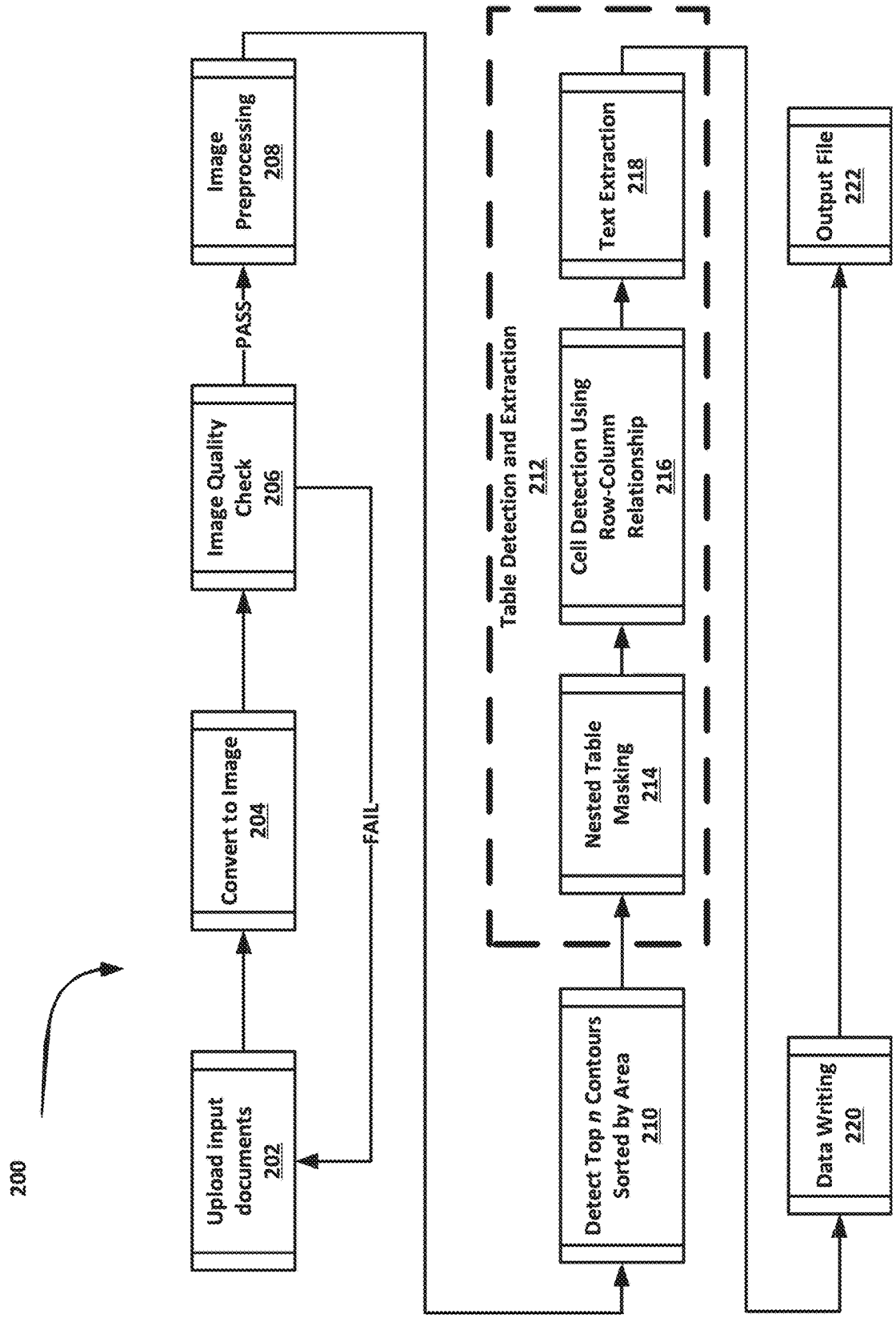
FIG. 2 illustrates a flowchart of an example process to detect and extract tabular data in accordance with the present subject matter.
Figure 6:
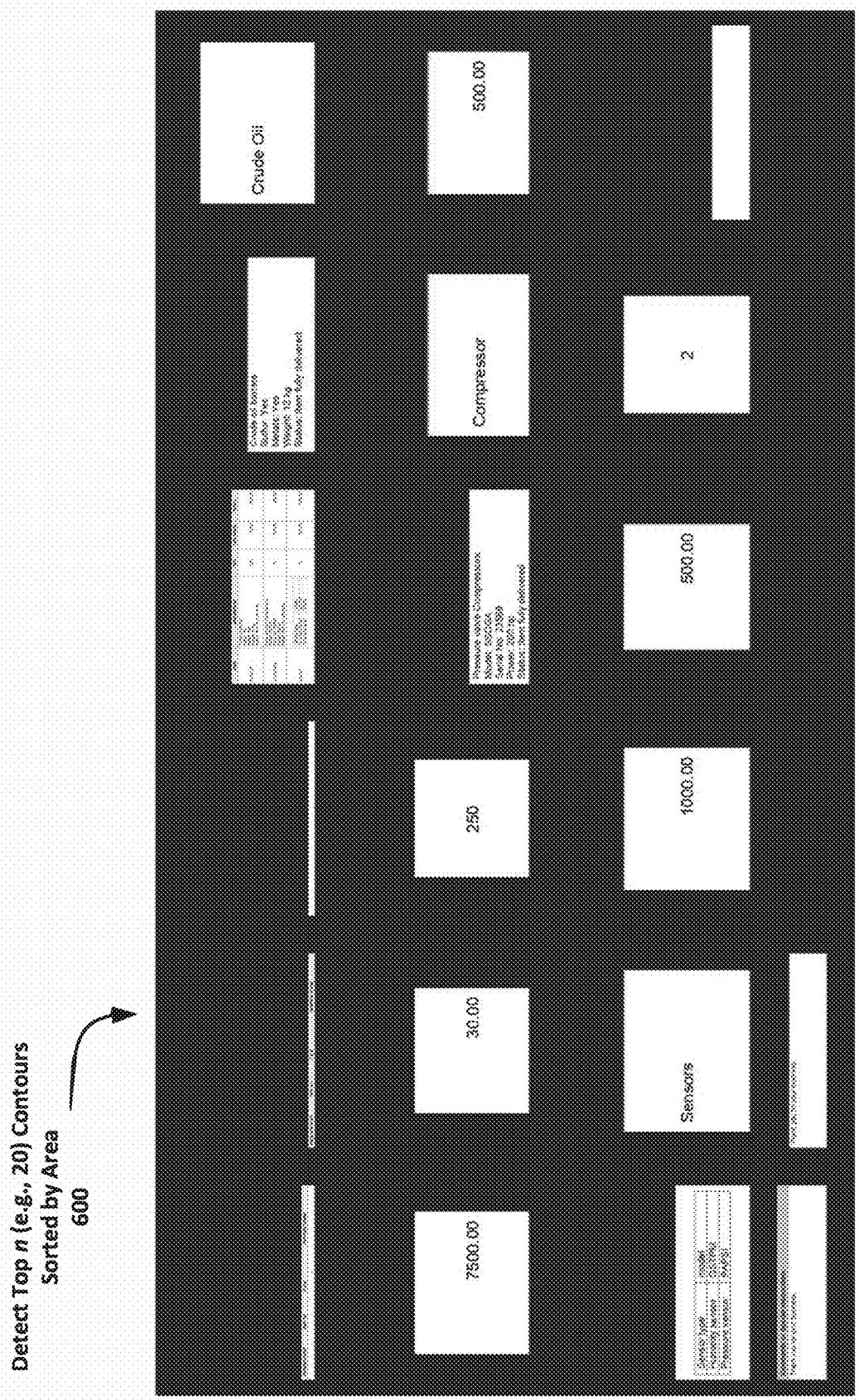
FIG. 6 illustrates examples of detected contours in the resultant stencil image and populated with the corresponding tabular cell data from the input scanned document.

FIG. 2 shows a flowchart of an example process 200 to detect and extract tabular data in accordance with the present subject matter. Process 200 may be executed by one or more computing systems, as will be further described with reference to FIGS. 9 and 10. Process 200 may include the steps of uploading input documents 202, converting the uploaded input documents to an image 204, performing an image quality check 206, performing image preprocessing 208, and detecting the top n contours of the image 210 sorted by area. As known in the computer vision arts, a contour may be understood as a boundary of an object in an image. In accordance with the present subject matter, a contour may be more specifically defined as a table cell, a contiguous group of table cells, a row of table cells, a column of table cells, or an entire table. FIG. 6 shows examples of contours, as will be subsequently described. Following step 210, table detection and 212 may be performed, which may encompass the steps of nested table masking 214, cell detection 216 using row-column relationship, and text extraction 218. The extracted text of step 218 may be subsequently written to a memory 220 and output 222 for presentation to a user.

In step 202, the input documents may be uploaded to the computing system(s) in which process 200 may be configured to execute. The input documents may include a variety of data, at least some of which may be arranged in a tabular format as illustrated in the examples of FIGS. 1A-1D. In an example, the input documents may be uploaded in a portable document format (PDF).

In step 204, the input documents uploaded in step 202 may be converted to an image. The image may be in any file format known in the computing arts. In a case where the input documents uploaded in step 202 were provided in an image file format, step 204 may be omitted.

Figure 3:
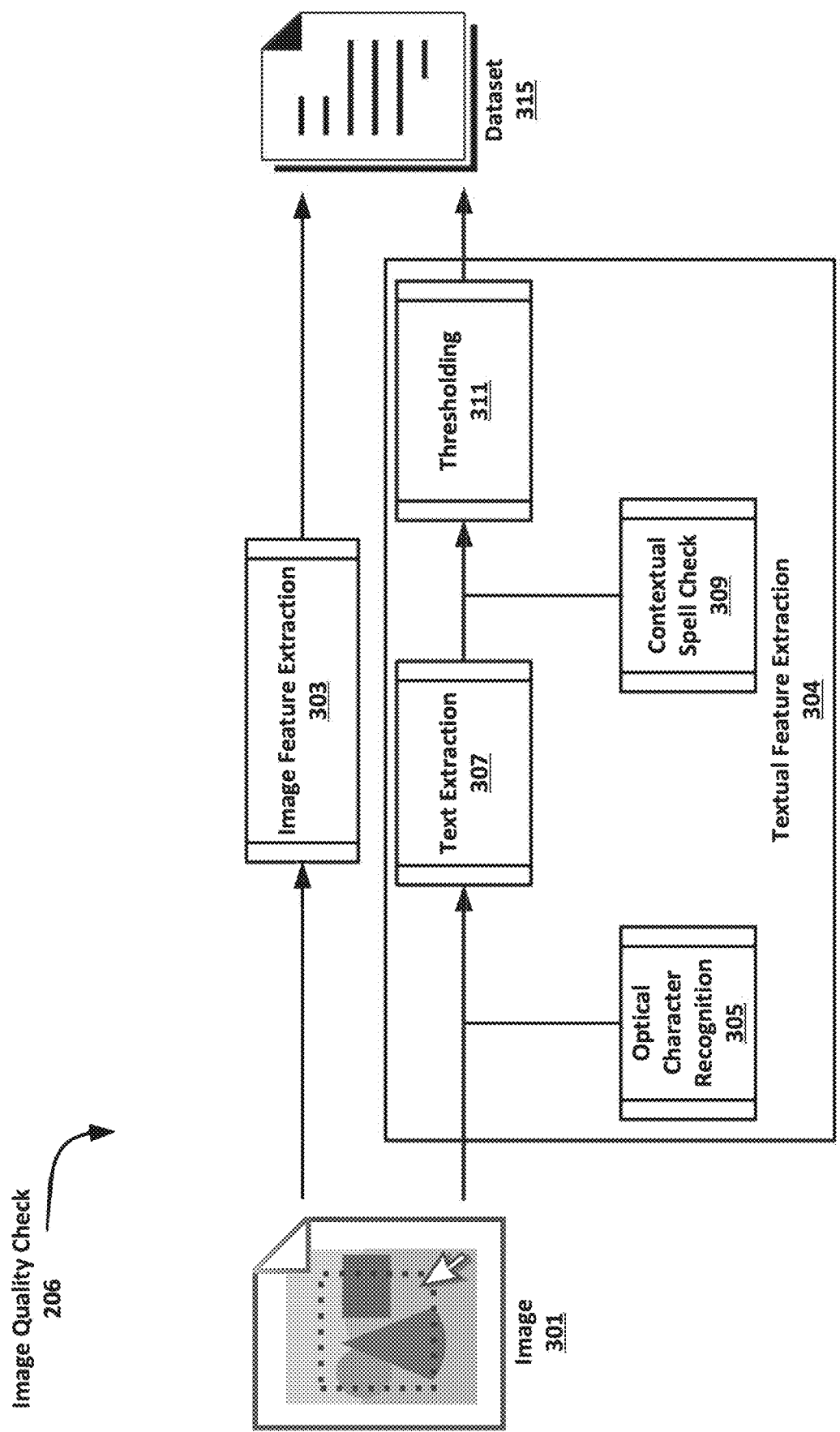
FIG. 3 illustrates a block diagram of a machine learning model to determine image quality in accordance with the present subject matter.

In step 206, an image quality check may be performed on the images converted in step 204 or otherwise uploaded in step 202. The image quality check 206 may be implemented using a machine learning model as shown in the block diagram of FIG. 3 to assess both the image characteristics and textual characteristics in determining an overall image quality. In an example, the image quality check 206 may be implemented using a logistic regression machine learning algorithm. Each image 301 provided to image quality check 206 may be subjected to image feature extraction 303 and text feature extraction steps 304 to compile a feature dataset 315 that may be used to assess the quality of an image 301. The image feature extraction 303 may provide data such as blurriness or high variance, glareness or binary variance, a variance of a rescaled image, a size of the image, a number of image channels (red, green blue, etc.), and a number of dots per inch (DPI). The text feature extraction 304 may perform an optical character recognition (OCR) step 305, a text extraction 307, a contextual spell check 309, and finally a thresholding step 311 to determine an weighted average of model coefficients of predictor variables. The target variable of the image quality check may be a binary value that indicates either suitable quality or unsuitable quality and based on the compiled dataset features. For instance, an image exhibiting a high degree of blurriness, glare, low resolution (DPI) and with spelling errors may be evaluated as poor quality and thus unsuitable to proceed in the process 200. In this case, as shown in FIG. 2, the image quality check step 206 may fail and return to step 202 where a user may be prompted to upload a new input document.

Where a converted image 204 passes the image quality check 206, process 200 may proceed to image preprocessing step 208. In this step, the image 301 may be processed to detect a tabular layout. This may be achieved using an adaptive thresholding module to handle a variety of background colors and patterns. The adaptive thresholding may perform intensity transformation by reducing the values of pixels below a threshold and by generating a bilevel image having black and white pixels only. A line removal module may remove spurious horizontal and vertical lines that may otherwise be erroneously detected as table cells. Finally, a denoising filter may remove any extra noise or pixels that may reduce the quality of text extraction and additionally convert the input scanned document to grayscale for subsequent processing. An example input scanned document 400 is shown in FIG. 4 while an example resultant image 500 after image preprocessing step 208 is carried out is shown in FIG. 5. The resultant image 500 may resemble a stencil that highlights the tabular layout alone and omits text, graphics, spurious lines, and colors. The resultant image 500 may be understood as binary in that structural features of the table(s) (e.g., cells, rows, columns, nested tables, etc.) may be represented by one color while all other information may be assigned to a second, contrasting color. The resultant image 500 may be generated using morphological operations such as erosion and dilation such that only horizontal and vertical lines may remain in the image, while all other pixels associated with text or images may be removed.

The resultant image 500 may then be processed to detect contours 210 with the objective of finding nested tables within those contours. Specifically, the top n largest contours by area of the tables displayed in the resultant image 500 may be detected. FIG. 6 shows an example of the top 20 contours 600 detected from the resultant image 500 and populated with the corresponding tabular cell data from input scanned document 400. While n is selected to be 20 in the example of FIG. 6, other values may be possible; preferably between 10 and 40.

Page ratio filters may be used in detecting the contours to avoid detection of smaller unwanted contours/individual cells and avoid detection of larger contours that encompass an entire page, for instance. For example, a page ratio filter may be configured to avoid detecting contours that exceed 95% of the total page area and/or contours that consist of less than 2% of the total page area. The page ratio filter may be variably configured to increase the likelihood of detecting nested tables rather than large tables or individual table cells.

Following step 210, a subset of operations generally directed to table detection and extraction 212 may continue process 200. The nested table masking process 214 may follow with reference to FIG. 7A. The present subject matter may be understood to employ a divide-and-conquer approach to text extraction of complex tabular data. Stated simply, process 200 may detect and extract text from nested table(s) 703 separately from the "parent" table(s). For each nested table 703 detected during contour detection step 210, the nested table 703 may be graphically masked on the original input scanned document 400, which results in masked image 705 and a separate image of the nested table 703. The masked image 705 may be identical to the input scanned document 400 except that the nested table(s) 703 may be concealed. The objective of nested table masking 214 may be to detect and conceal all nested tables 703 within the input scanned document 400 so that the masked image 705 contains only tables that may be free of nested tables. The detected nested table(s) 703 and non-nested tables in the masked image 705 may then be separately processed according to the cell detection and text extraction techniques, which will be subsequently described. It should be appreciated that where the contour detection step 210 reveals no nested tables, masking the input scanned document 400 and correspondingly generating the masked image 705 may be unnecessary. Similarly, detected contours representing an individual cell or a plurality of cells that are not nested within a parent table may not be masked.

Figure 8B:
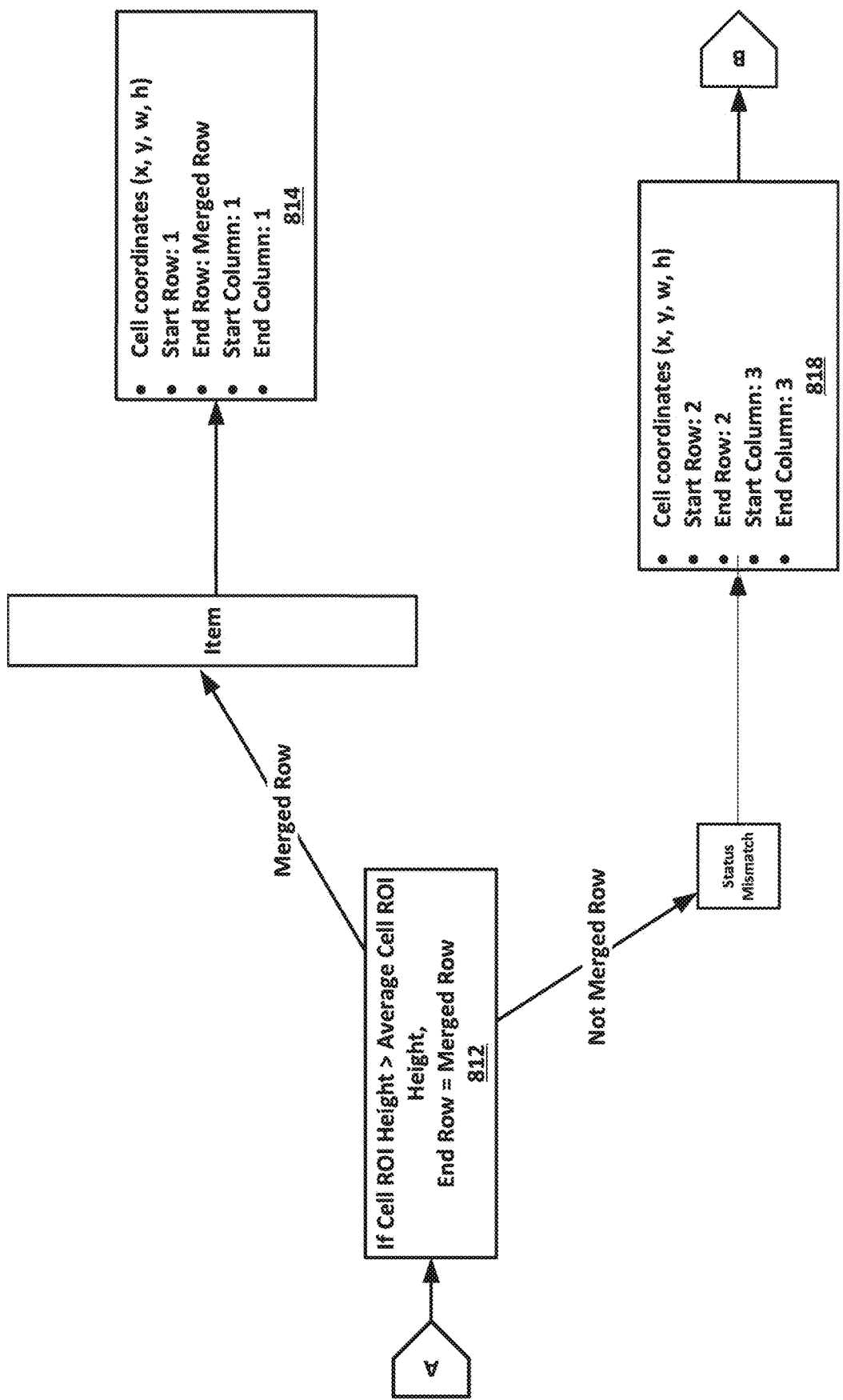
FIG. 8B illustrates a portion of a cell detection process in accordance with the present subject matter.
Figure 8C:
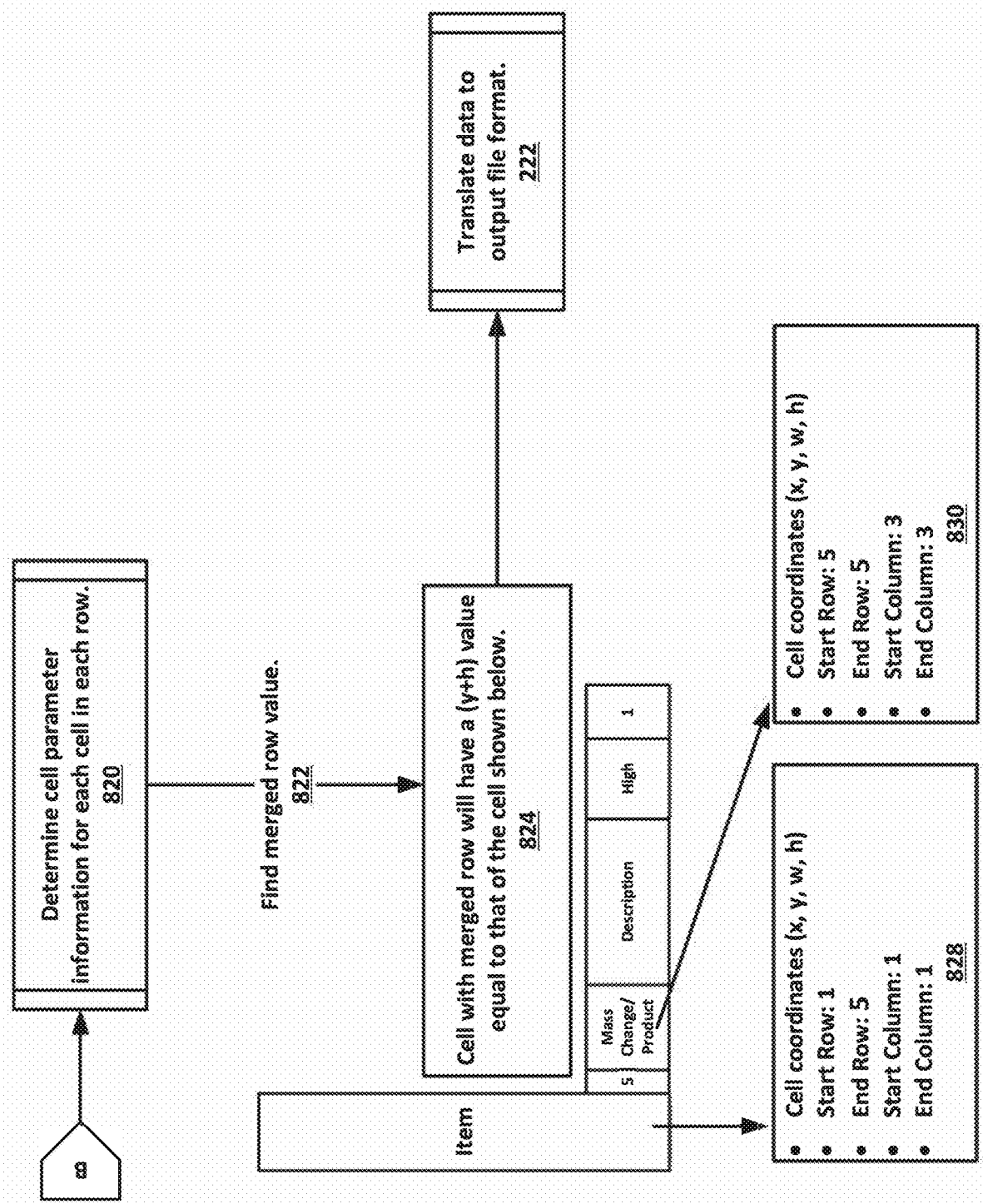
FIG. 8C illustrates a portion of a cell detection process in accordance with the present subject matter.

FIG. 7B shows a subsequent cell region of interest (ROI) detection and extraction process 750 that may be performed on each detected nested table(s) 703 as well as the tables remaining in masked image 705. As used herein, a cell ROI is distinct from a true table cell. In particular, a cell ROI may merely represent a portion of an input image that is being interpreted by the computing system as potentially corresponding to a table, a cell, or a group of cells. A portion of an input image may become a cell ROI when an algorithm executing on the computing system identifies the portion of the input image as potentially being a table, a cell, or a group of cells. Therefore, the cell ROIs described in accordance with FIGS. 7 and 8 are not true table cells that conform to a tabular data file format, such as a csv, xls, txt, JSON, or the like. Rather, cell ROIs may be specifically identified portions of an image file format. Adaptive thresholding may be applied to each detected table to obtain a bilevel image having only black and white pixels (or other contrasting colors) to handle tables with varying backgrounds. Each cell ROI may be also preprocessed similarly as previously discussed with reference to the preprocessing step that may be used to generate the resultant image 500. In this case, the preprocessing may create a stencil image having horizontally and vertically dilated cells 753. Blob and contour detection 754 may then be applied to the stencil image to identify a region having black pixels that form boundaries to determine cell ROIs 755. From the cell ROIs 755, individual cells may be detected, as will be further described with reference to FIGS. 8A-8C. Finally, text may be extracted from the detected cells and written into an output file format in step 757.

The determined cell ROIs 755 may be further processed to detect and extract text from each individual cell and to generate associated parameter information 808 with reference to FIGS. 8A-8C. For each detected cell, its cell coordinates (pixel values), start row value, end row value, start column value, and end column value may be specified to define a row-column relationship. It should be appreciated that the cell coordinates of parameter information block 808 may specify the position and size of a cell ROI in terms of pixels of an image, while the remaining parameters (start row, end row, start column, end column) may specify the position and size of a cell in terms of a conventional tabular data format (e.g., csv, xls, JSON, txt, or the like).

Following blob and contour detection 754, each cell ROI 755 may be defined by its respective cell coordinates (x, y, w, h) 804, where x and y may be the pixel coordinates of the top-left corner of the contour, w is the width of the contour in pixels, and h is the height of the contour in pixels. The coordinates 804 may be used to begin sorting cells row-wise using the y-coordinates in step 806 of FIG. 8A. Individual cells having same y-coordinates may be interpreted to be in a same row. An average height of all cell ROIs 755 may be computed in step 810 for subsequent comparison with the height of each cell in step 812. Where the cell ROI height of a cell ROI is greater than the computed average cell ROI height, it may be determined that the cell ROI has a merged row that spans multiple rows of other cells within the same table. As shown in the example of FIG. 8B, the cell containing the text "Item" spans multiple rows, which is determined in step 812. The parameter information 814, specifically the end row value, for that cell may be set to "merged row" as shown in FIG. 8B. The value of "merged row" may be subsequently determined as will be described. In contrast, the height of the cell ROI containing the text "Status Mismatch" is not greater than the average cell height, and so this cell is not considered to have a merged row. Therefore, this cell's start row and end row parameters 818 may be the same (i.e., 2).

As shown in the example of FIG. 8C, the cell parameter information block 808 may be continually determined for each cell in each subsequent row in step 820. Finding the value of "merged row" (i.e., the end row value) 822 for the merged cell containing the text "Item" may be determined by identifying a cell having a same "y+h" summed coordinate value. For example, the cell containing the text "Item" may have pixel coordinate values (x, y, w, h) of y=0 and h=5, while the cell containing the text "Mass Change/Product" may have coordinate values of y=4 and h=1. Since it is true that y+h=5 for both cells, the end row value of the merged cell containing the text "Item" may be the same as the end row value of the cell containing the text "Mass Change/Product." In this example and as can be seen from FIG. 8A, the end row value for both cells is 5. The cell parameter information 828 for the cell containing the text "Item" and the cell parameter information 830 for the cell containing the text "Mass Change/Product" reflect the same.

As a result of cell detection step 216, each cell of the input scanned document 400 may be detected and specified precisely in an associated cell parameter information block 808. Following the detection of all cells, a text extraction process 218 that utilizes OCR may recognize the textual data of each cell. Each cell may then be captured in an output file format during data writing step 220 that generates an output file 222 in any preferred format (e.g., csv, json, txt, xls, etc.). As previously described, where a spreadsheet file format is selected, each detected nested table 703 and each non-nested table may be saved as a separate sheet in the spreadsheet file format. Each sheet that includes an extracted description of a nested table may be referenced from a sheet that includes an extracted description of a (non-nested) parent table. Spreadsheet file formats contemplated for use with the present subject matter may be unable to correctly display nested tables.

Figure 9:
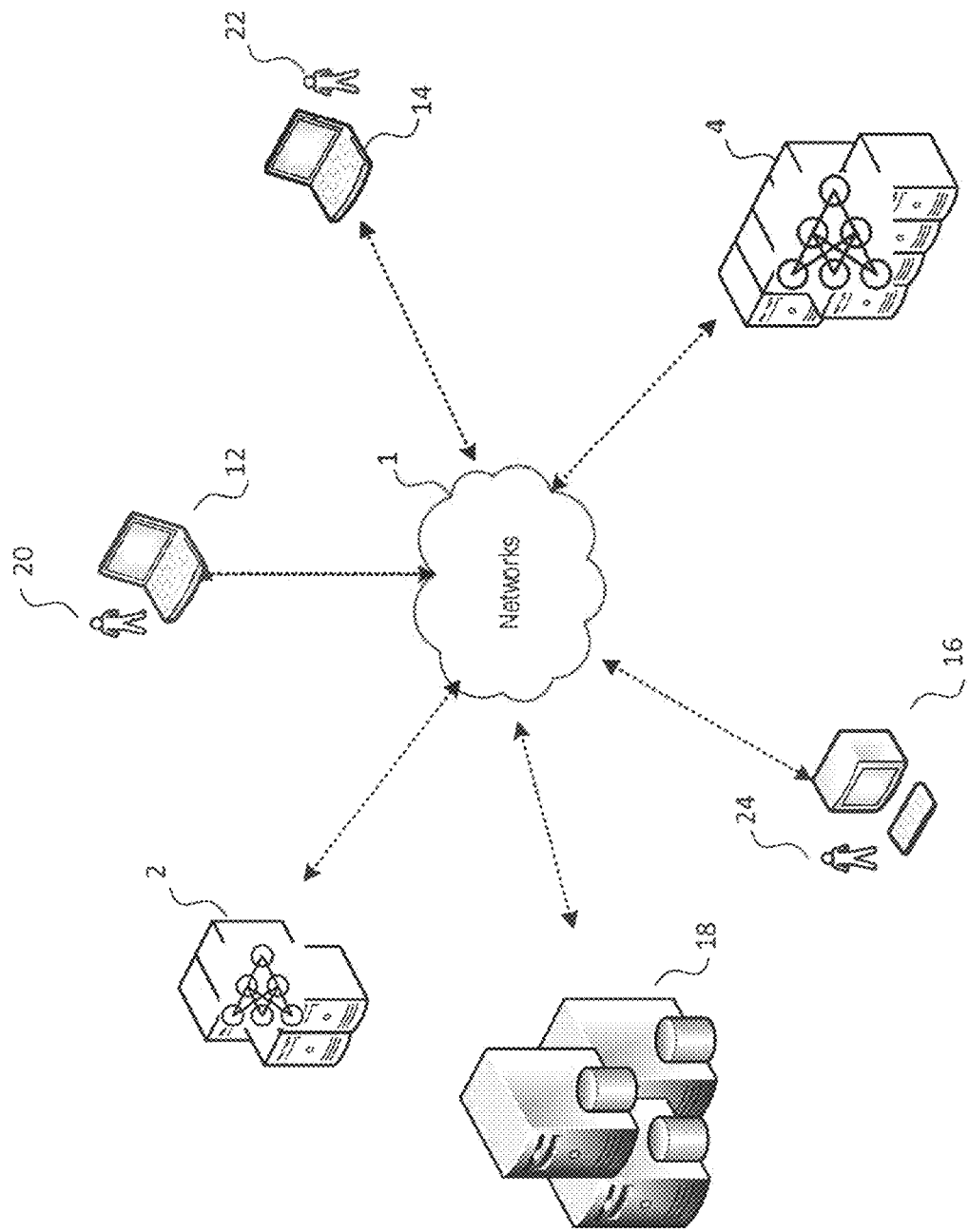
FIG. 9 illustrates an example electronic communication environment for implementing the intelligent nested table detection and extraction system.

FIG. 9 shows an example electronic communication environment 10 in which an intelligent nested table detection and extraction system may be implemented. The electronic communication environment 10 may include a portion or all the following: one or more servers 2 and 4, one or more user devices 12, 14, and 16 associated with users 20, 22, and 24, and one or more databases 18, in communication with each other via public or private communication networks 1.

The user devices 12, 14, and 16 may be any form of mobile or fixed electronic devices including but not limited to desktop personal computer, laptop computers, tablets, mobile phones, personal digital assistants, and the like.

The one or more database 18 of FIG. 9 may be hosted in a central database server, a plurality of distributed database servers, or in cloud-based database hosts. The database 18 may be organized and implemented in any form, including but not limited to document database containing text data (and/or other types of data), lists of topics, keywords, and/or entities, embedding space database containing embeddings (or embedding vectors) and relationships, and the like. The database 18 may be configured to store the intermediate data and/or final results for implementing the intelligent nested table detection and extraction system.

FIG. 10 shows an example computer system 26 for implementing the one or more servers 2 and 4, or the user devices 12, 14, and 16. The computer system 26 may include communication interfaces 28, system circuitry 30, input/output (I/O) interfaces 32, storage/memory 35, and display circuitry 34 that generates machine interfaces 36 locally or for remote display, e.g., in a web browser running on a local or remote machine. The machine interfaces 36 and the I/O interfaces 32 may include GUIs, touch sensitive displays, voice or facial recognition inputs, buttons, switches, speakers, and other user interface elements. Additional examples of the I/O interfaces 32 include microphones, video and still image cameras, headset and microphone input/output jacks, Universal Serial Bus (USB) connectors, memory card slots, and other types of inputs. The I/O interfaces 32 may further include magnetic or optical media interfaces (e.g., a CD-ROM or DVD drive), serial and parallel bus interfaces, and keyboard and mouse interfaces.

The communication interfaces 28 may include wireless transmitters and receivers ("transceivers") 38 and any antennas 40 used by the transmitting and receiving circuitry of the transceivers 38. The transceivers 38 and antennas 40 may support Wi-Fi network communications, for instance, under any version of IEEE 802.11, e.g., 802.11n or 802.11ac. The communication interfaces 28 may also include wireline transceivers 42. The wireline transceivers 42 may provide physical layer interfaces for any of a wide range of communication protocols, such as any type of Ethernet, data over cable service interface specification (DOCSIS), digital subscriber line (DSL), Synchronous Optical Network (SONET), or other protocol.

The storage/memory 35 may be used to store various initial, intermediate, or final data or model for implementing the intelligent nested table detection and extraction system. These data may alternatively be stored in the database 18 of FIG. 5. In one implementation, the storage/memory 35 of the computer system 26 may be integral with the database 18 of FIG. 5. The storage/memory 35 may be centralized or distributed, and may be local or remote to the computer system 26. For example, the storage/memory 35 may be hosted remotely by a cloud computing service provider.

The system circuitry 30 may include hardware, software, firmware, or other circuitry in any combination. The system circuitry 30 may be implemented, for example, with one or more systems on a chip (SoC), application specific integrated circuits (ASIC), microprocessors, discrete analog and digital circuits, and other circuitry.

For example, the system circuitry 30 may be implemented as 46 for the intelligent nested table detection and extraction system. The system circuitry 30 may include one or more processors 47 and memories 48. The memories 48 stores, for example, control instructions 52 and an operating system 50. The control instructions 52, for example may include instructions for implementing the components 54 of the intelligent nested table detection and extraction system. In one implementation, the instruction processors 47 execute the control instructions 52 and the operating system 50 to carry out any desired functionality related to the intelligent nested table detection and extraction system.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect relates to a method for detecting and extracting data from a nested table, comprising identifying a contour image of a first table disposed within a cell of a second table from an input image; masking the first table on the input image to generate a masked image of the second table that omits the first table; detecting cells of the first table and the second table, comprising identifying a plurality of regions of interest (ROIs), determining a row of a plurality of cells based on a common y-coordinate among of the plurality of ROIs, and generating cell parameter information for each of the plurality of cells that identifies the y-coordinate, a size, and a relative position of each determined cell; and generating an output file based on the cell parameter information of the plurality of cells.

A second aspect relates to the method of the first aspect, further comprising preprocessing the input image to generate a stencil image consisting of horizontal and vertical lines that represent a layout of the first table and the second table.

A third aspect relates to the first or second aspect, wherein the preprocessing further includes applying adaptive thresholding to generate the stencil image with only two contrasting colors, and the method further includes identifying a plurality of contours of the stencil image.

A fourth aspect relates to the method of any previous aspect, further comprising calculating an average height of the plurality of ROIs; determining a height of an ROI of the plurality of ROIs; and comparing the average height with the determined height of the ROI.

A fifth aspect relates to the method of any previous aspect, further comprising identifying a cell having a merged row in response to the average height being less than the determined height of the ROI.

A sixth aspect relates to the method of any previous aspect, further comprising identifying a cell not having a merged row in response to the average height not being less than the determined height of the ROI; wherein the cell parameter information for each determined cell comprises: a start row value, an end row value, and the method further comprises: determining the end row value of the cell not having the merged row to be the same as the start row value.

A seventh aspect relates to the method of any previous aspect, wherein the cell parameter information for each determined cell comprises: an end row value, and a cell height value; and the method further comprises: determining the end row value of the cell having the merged row by identifying another determined cell having an identical sum of the y-coordinate and the cell height value.

An eighth aspect relates to the method of any previous aspect, wherein the end row value of the cell having the merged row is the same as the end row value of the another determined cell having the identical sum of the y-coordinate and cell height value.

A ninth aspect relates to the method of any previous aspect, further comprising: determining a binary target variable indicating whether the input image is suitable based on: evaluating a plurality of image features, optically recognizing text within the input image, and performing a spell check of the optically recognized text.

A tenth aspect relates to the method of any previous aspect, wherein the output file comprises: a first sheet generated based on the cell parameter information associated with the first table; and a second sheet generated based on the cell parameter information associated with the second table.

An eleventh aspect relates to a system comprising: a processor; a memory in communication with the processor storing instructions executable by the processor to configure the system to: identify a contour image of a first table disposed within a cell of a second table from an input image; mask the first table on the input image to generate a masked image of the second table that omits the first table; detect cells of the first table and the second table based on: an identification of a plurality of regions of interest (ROIs), a determination of a row of a plurality of cells based on a common y-coordinate among of the plurality of ROIs, and cell parameter information for each of the plurality of cells that identifies the y-coordinate, a size, and a relative position of each determined cell; and generate an output file based on the cell parameter information of the plurality of cells.

A twelfth aspect relates to the system of the eleventh aspect, wherein the memory further comprises instructions executable by the processor to configure the system to: preprocess the input image to generate a stencil image consisting of horizontal and vertical lines that represent a layout of the first table and the second table.

A thirteenth aspect relates to the system of aspects 11 or 12, wherein the preprocess further includes an application of adaptive thresholding to generate the stencil image with only two contrasting colors, and the memory further comprises instructions executable by the processor to configure the system to: identify a plurality of contours of the stencil image.

A fourteenth aspect relates to the system of aspects 11-13, wherein the memory further comprises instructions executable by the processor to configure the system to: calculate an average height of the plurality of ROIs; determine a height of an ROI of the plurality of ROIs; and compare the average height with the determined height of the ROI.

A fifteenth aspect relates to the system of aspects 11-14, wherein the memory further comprises instructions executable by the processor to configure the system to: identify a cell having a merged row in response to the average height being less than the determined height of the ROI.

A sixteenth aspect relates to the system of aspects 11-15, wherein the memory further comprises instructions executable by the processor to configure the system to: identify a cell not having a merged row in response to the average height not being less than the determined height of the ROI; wherein the cell parameter information for each determined cell comprises: a start row value, an end row value, and the memory further comprises instructions executable by the processor to configure the system to: determine the end row value of the cell not having the merged row to be the same as the start row value.

A seventeenth aspect relates to the system of aspects 11-16, wherein the cell parameter information for each determined cell comprises: an end row value, and a cell height value; and the memory further comprises instructions executable by the processor to configure the system to: determine the end row value of the cell having the merged row by identifying another determined cell having an identical sum of the y-coordinate and the cell height value.

An eighteenth aspect relates to the system of aspects 11-17, wherein the end row value of the cell having the merged row is the same as the end row value of the another determined cell having the identical sum of the y-coordinate and cell height value.

A nineteenth aspect relates to the system of aspects 11-18, wherein the memory further comprises instructions executable by the processor to configure the system to: determine a binary target variable indicating whether the input image is suitable based on: an evaluation of a plurality of image features, optically recognized text within the input image, and a spell check of the optically recognized text.

A twentieth aspect relates to the system of aspects 11-19, wherein the output file comprises: a first sheet generated based on the cell parameter information associated with the first table; and a second sheet generated based on the cell parameter information associated with the second table.

The invention claimed is:
1. A method for detecting and extracting data from a nested table, comprising:
identifying a contour image of a first table disposed within a cell of a second table from an input image;
masking the first table on the input image to generate a masked image of the second table that omits the first table;
detecting cells of the first table and the second table, comprising:
identifying a plurality of regions of interest (ROIs),
determining a row of a plurality of cells based on a common y-coordinate among of the plurality of ROIs, and
generating cell parameter information for each of the plurality of cells that identifies the y-coordinate, a size, and a relative position of each determined cell; and
generating an output file based on the cell parameter information of the plurality of cells.

2. The method of claim 1, further comprising:
preprocessing the input image to generate a stencil image consisting of horizontal and vertical lines that represent a layout of the first table and the second table.

3. The method of claim 2, wherein
the preprocessing further includes applying adaptive thresholding to generate the stencil image with only two contrasting colors, and
the method further includes:
identifying a plurality of contours of the stencil image.

4. The method of claim 1, further comprising:
calculating an average height of the plurality of ROIs;
determining a height of an ROI of the plurality of ROIs; and
comparing the average height with the determined height of the ROI.

5. The method of claim 4, further comprising:
identifying a cell having a merged row in response to the average height being less than the determined height of the ROI.

6. The method of claim 5, wherein
the cell parameter information for each determined cell comprises:
an end row value, and
a cell height value; and the method further comprises:
determining the end row value of the cell having the merged row by identifying another determined cell having an identical sum of the y-coordinate and the cell height value.

7. The method of claim 6, wherein
the end row value of the cell having the merged row is the same as the end row value of the another determined cell having the identical sum of the y-coordinate and cell height value.

8. The method of claim 4 further comprising:
identifying a cell not having a merged row in response to the average height not being less than the determined height of the ROI; wherein
the cell parameter information for each determined cell comprises:
a start row value,
an end row value, and
the method further comprises:
determining the end row value of the cell not having the merged row to be the same as the start row value.

9. The method of claim 1, further comprising:
determining a binary target variable indicating whether the input image is suitable based on:
evaluating a plurality of image features, optically recognizing text within the input image, and performing a spell check of the optically recognized text.

10. The method of claim 1, wherein the output file comprises:
a first sheet generated based on the cell parameter information associated with the first table; and
a second sheet generated based on the cell parameter information associated with the second table.

11. A system comprising:
a processor;
a memory in communication with the processor storing instructions executable by the processor to configure the system to:
identify a contour image of a first table disposed within a cell of a second table from an input image;
mask the first table on the input image to generate a masked image of the second table that omits the first table;
detect cells of the first table and the second table based on:
an identification of a plurality of regions of interest (ROIs),
a determination of a row of a plurality of cells based on a common y-coordinate among of the plurality of ROIs, and
cell parameter information for each of the plurality of cells that identifies the y-coordinate, a size, and a relative position of each determined cell; and
generate an output file based on the cell parameter information of the plurality of cells.

12. The system of claim 11, wherein the memory further comprises instructions executable by the processor to configure the system to:
preprocess the input image to generate a stencil image consisting of horizontal and vertical lines that represent a layout of the first table and the second table.

13. The system of claim 12, wherein
the preprocess further includes an application of adaptive thresholding to generate the stencil image with only two contrasting colors, and
the memory further comprises instructions executable by the processor to configure the system to:
identify a plurality of contours of the stencil image.

14. The system of claim 11, wherein the memory further comprises instructions executable by the processor to configure the system to:
calculate an average height of the plurality of ROIs;
determine a height of an ROI of the plurality of ROIs; and
compare the average height with the determined height of the ROI.

15. The system of claim 14, wherein the memory further comprises instructions executable by the processor to configure the system to:
identify a cell having a merged row in response to the average height being less than the determined height of the ROI.

16. The system of claim 14, wherein the memory further comprises instructions executable by the processor to configure the system to:
identify a cell not having a merged row in response to the average height not being less than the determined height of the ROI; wherein
the cell parameter information for each determined cell comprises:
a start row value,
an end row value, and
the memory further comprises instructions executable by the processor to configure the system to:
determine the end row value of the cell not having the merged row to be the same as the start row value.

17. The system of claim 15, wherein
the cell parameter information for each determined cell comprises:
an end row value, and
a cell height value; and
the memory further comprises instructions executable by the processor to configure the system to:
determine the end row value of the cell having the merged row by identifying another determined cell having an identical sum of the y-coordinate and the cell height value.

18. The system of claim 17, wherein
the end row value of the cell having the merged row is the same as the end row value of the another determined cell having the identical sum of the y-coordinate and cell height value.

19. The system of claim 11, wherein the memory further comprises instructions executable by the processor to configure the system to:
determine a binary target variable indicating whether the input image is suitable based on:
an evaluation of a plurality of image features,
optically recognized text within the input image, and
a spell check of the optically recognized text.

20. The system of claim 11, wherein the output file comprises:
a first sheet generated based on the cell parameter information associated with the first table; and
a second sheet generated based on the cell parameter information associated with the second table.

* * * * *